United States Patent [19]

Stingelin

[11] Patent Number: 4,921,945
[45] Date of Patent: May 1, 1990

[54] DISAZO DYES CONTAINING AN ACETOACETABUKUBE COUPLING COMPONENT AND A QUATERNIZED AMINOALKYLENE AMINOCARBONYL GROUP BOUND TO IT

[75] Inventor: Willy Stingelin, Reinach, Switzerland

[73] Assignee: Ciba-Geigy Corporation, Ardsley, N.Y.

[21] Appl. No.: 198,266

[22] Filed: May 25, 1988

[30] Foreign Application Priority Data

Jun. 3, 1987 [CH] Switzerland ............... 2095/87

[51] Int. Cl.⁵ ............... C09B 44/02; C09B 44/08; D06P 1/41; D21H 1/46
[52] U.S. Cl. ............... 534/614; 534/579; 534/582; 534/604; 534/605; 534/606; 534/613; 558/27; 564/157; 564/164
[58] Field of Search ............... 534/589, 605, 604, 606, 534/614, 603

[56] References Cited

U.S. PATENT DOCUMENTS 3,252,965 5/1966 Entschel et al. ............... 534/604
4,509,948 4/1985 Wild et al. ............... 8/539
4,656,256 4/1987 Colberg et al. ............... 534/604

Primary Examiner—Floyd D. Higel
Assistant Examiner—Fiona T. Powers
Attorney, Agent, or Firm—Edward McC. Roberts; George R. Dohmann

[57] ABSTRACT

Disazo dyes which are useful for dyeing and printing, of the formula

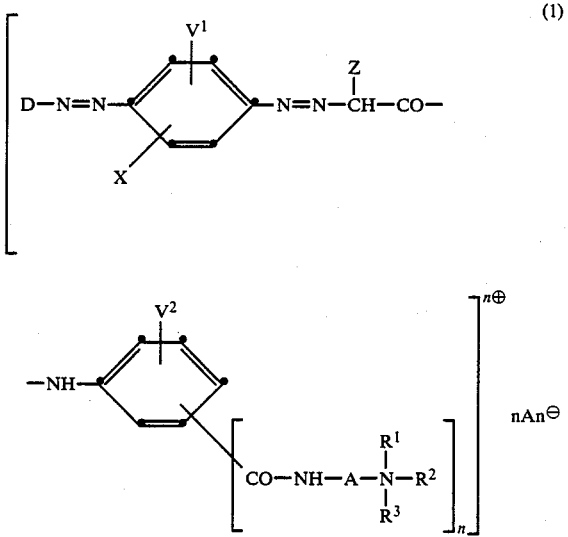

in which:

D is the radical of a substituted or unsubstituted, homocyclic or heterocyclic diazo component, $V^1$ and $V^2$ independently of one another are hydrogen, substituted or unsubstituted $C_1$-$C_4$alkyl or $C_1$-$C_4$alkoxy, halogen or cyano, X is hydrogen, substituted or unsubstituted $C_1$-$C_4$alkyl or $C_1$-$C_4$alkoxy, halogen, cyano or a group of the formula —NH—CHO, —NH—CO—NH$_2$, —NH—CO—NH—Q or —NH—CO—(O)$_m$—Q in which m is zero or 1 and Q is substituted or unsubstituted $C_1$-$C_4$alkyl or phenyl, Z is $C_1$-$C_4$alkyl—CO—, —CN, —COO—$C_1$-$C_4$alkyl, —CONH$_2$ or —CO—$C_6H_5$, $R^1$, $R^2$ and $R^3$ independently of one another are in each case a substituted or unsubstituted alkyl radical or $R^1$ and $R^2$, together with the nitrogen atom linking them, or $R^1$, $R^2$ and $R^3$, together with the nitrogen atom linking them, are a heterocyclic radical, A is an alkylene radical having 2 to 6 C atoms, n is 1 or 2 and An$^\ominus$ is an anion.

13 Claims, No Drawings

DISAZO DYES CONTAINING AN ACETOACETABUKUBE COUPLING COMPONENT AND A QUATERNIZED AMINOALKYLENE AMINOCARBONYL GROUP BOUND TO IT

The invention relates to novel cationic disazo dyes, to a process for their preparation and to their use as dyes, particularly for dyeing textile materials and especially paper.

The novel disazo dyes have the formula

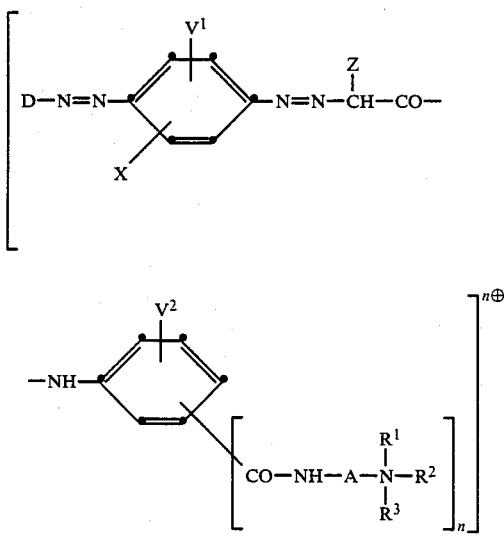

in which: D is the radical of a substituted or unsubstituted, homocyclic or heterocyclic diazo component, $V^1$ and $V^2$ independently of one another are hydrogen, substituted or unsubstituted $C_1$-$C_4$alkyl or $C_1$-$C_4$alkoxy, halogen or cyano, X is hydrogen, substituted or unsubstituted $C_1$-$C_4$alkyl or $C_1$-$C_4$alkoxy, halogen, cyano or a group of the formula —NH—CHO, —NH—CO—NH$_2$—, —NH—CO—NH—Q or —NH—CO—(O)$_m$—Q in which m is zero or 1 and Q is substituted or unsubstituted $C_1$-$C_4$alkyl or phenyl, Z is $C_1$-$C_4$alkyl—CO—, —CN, —COO—$C_1$-$C_4$alkyl, —CONH$_2$ or —CO—$C_6$H$_5$, $R^1$, $R^2$ and $R^3$ independently of one another are in each case a substituted or unsubstituted alkyl radical or $R^1$ and $R^2$, together with the nitrogen atom linking them, or $R^1$, $R^2$ and $R^3$, together with the nitrogen atom linking them, are a heterocyclic radical, A is an alkylene radical having 2 to 6 C atoms, n is 1 or 2 and An$^\ominus$ is an anion.

D is the radical of an aromatic, homocyclic or heterocyclic diazo component.

This can be, for example, thienyl, thiazolyl, isothiazolyl, 1,2,4-thiadiazolyl, 1,3,4-thiadiazolyl, benzothiazolyl, benzoisothiazolyl, pyrazolyl, imidazolyl, 1,2,3-triazolyl, 1,2,4-triazolyl, pyridyl or phenyl. Each of these systems can carry futher substituents, such as alkyl or alkoxy having 1 to 4 carbon atoms in each case, halogen, especially chlorine or bromine, trifluoromethyl, cyano, nitro, acyl, benzoyl, carboalkoxy, especially carbomethoxy or carboethoxy, alkylsulfonyl having 1 to 4 carbon atoms, phenylsulfonyl, sulfonamide or arylazo, in particular phenylazo or the radical

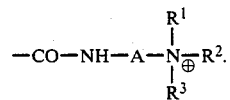

Any 2 adjacent substituents in the ring systems mentioned can also together form further fused rings, for example phenyl rings or cyclic imides.

D is preferably a benzothiazolyl, pyridyl or phenyl radical which is unsubstituted or monosubstituted or disubstituted by one of the abovementioned radicals.

The preferred meaning of D is phenyl which is substituted by not more than 4 substituents, which may be different, from the enumeration mentioned above. Amongst the substituents enumerated, $C_1$-$C_4$alkyl, $C_1$-$C_4$alkoxy, chlorine or a group of the formula

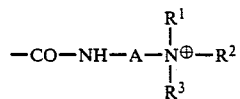

is preferred.

In general, alkyl groups are to be understood, in accordance with the invention, as meaning linear or branched alkyl groups. These are, for example, methyl, ethyl, propyl, isopropyl, butyl, isobutyl, tert-butyl, amyl, tert-amyl(1,1-dimethylpropyl), 1,1,3,3-tetramethylbutyl, hexyl, 1-methylpentyl, neopentyl, 1-, 2- or 3-methylhexyl, heptyl, n-octyl, tert-octyl, 2-ethylhexyl, n-nonyl, isononyl, decyl, dodecyl, cyclopentyl, cyclohexyl and methylcyclohexyl and also the appropriate isomers.

These alkyl radicals can be substituted, for example by hydroxyl, alkoxy having 1 to 4 carbon atoms, in particular methoxy, cyano or phenyl. Suitable further substituents are halogen, such as fluorine, chlorine or bromine, or —CO—U in which U is alkyl having 1 to 6 carbon atoms or phenyl.

Examples of suitable alkoxy radicals are methoxy, ethoxy, propoxy, isopropoxy, n-butoxy, isobutoxy or tert-butoxy.

The following are examples of suitable substituted alkyl radicals: methoxymethyl, ethoxymethyl, ethoxyethyl, ethoxypropyl, n-propoxymethyl, isopropoxymethyl, butoxymethyl, butoxyethyl, butoxypropyl, ethoxypentyl, methoxybutyl, ethoxypentyl, 2-hydroxyethoxypentyl, cyanoethyl and hydroxyethyl.

A is an alkylene radical having 2 to 6 C atoms, preferably an unbranched radical, for example ethylene, propylene, butylene, pentylene or hexylene. A is preferably ethylene or butylene and especially propylene.

$R^1$, $R^2$ and $R^3$ independently of one another are in each case a substituted or unsubstituted alkyl radical, for example methyl, ethyl, n-propyl, iso-propyl, n-, sec- or tert-butyl, linear or branched pentyl or hexyl, cyclopentyl or cyclohexyl, it being possible for these radicals to be substituted, for example by hydroxyl, phenyl or alkoxy. Examples of such substituted radicals are hydroxymethyl, hydroxyethyl, methoxyethyl, ethoxyethyl, propoxypropyl or benzyl.

Together with the nitrogen atom linking them, $R^1$ and $R^2$ can also be a heterocyclic radical, for example a pyrrolidine, piperidine, morpholine or piperazine radical, or $R^1$, $R^2$ and $R^3$, together with the nitrogen atom linking them, form a heterocyclic radical, for example a pyridinium radical or a monoquaternized triethylenediamine radical.

$R^1$ is preferably methyl or hydroxyethyl and $R^2$ and $R^3$ independently of one another are preferably $C_1$-$C_3$alkyl in each case, in particular methyl in each case.

$V^1$ and $V^2$ independently of one another are each hydrogen, halogen, CN, $C_1$-$C_4$alkyl or $C_1$-$C_4$alkoxy, it being possible for the last-mentioned groups to be substituted, for example by hydroxyl, halogen, such as bromine or especially chlorine, cyano or $C_1$-$C_4$alkoxy. $V^1$ and $V^2$ are preferably hydrogen, methyl or methoxy in each case, especially hydrogen in each case.

X is hydrogen, $C_1$-$C_4$alkyl, $C_1$-$C_4$alkoxy, halogen, such as bromine or chlorine, cyano or a group of the formula
—NH—CHO,
—NH—CO—NH$_2$,
—NH—CO—NHQ or
—NH—CO—(O)$_m$—Q,
in which m is zero or 1 and Q is substituted or unsubstituted $C_1$-$C_4$alkyl or phenyl. Examples of suitable substituents for the alkyl groups Q are halogen, such as chlorine or bromine, or, in particular, groups of the formulae

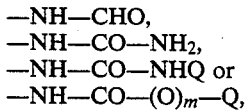

The radical Z is preferably —CO—CH$_3$, —CN, —COOC$_1$-C$_2$alkyl, —CO—NH$_2$ or —CO—C$_6$H$_5$, —CO—CH$_3$ being very particularly preferred.

Suitable anions An$^\ominus$ are either inorganic or organic anions; the following are mentioned as examples: halide, such as chloride, bromide or iodide, sulfate, methylsulfate, tetrafluoroborate, aminosulfonate, perchlorate, carbonate, bicarbonate, phosphate, phosphomolybdate, phosphotungstate, phosphotungstomolybdate, benzenesulfonate, naphthalenesulfonate, 4-chlorobenzenesulfonate, oxalate, maleate, acetate, propionate, lactate, succinate, chloroacetate, tartrate, methanesulfonate or benzoate ions, or complex anions, such as the ion of zinc chloride double salts.

In general, the anion is predetermined by the process of preparation. The chlorides, bisulfates, sulfates, methosulfates, phosphates, formates, lactates or acetates are preferably present. The anions can be replaced by other anions in a known manner.

A preferred embodiment of the invention relates to azo dyes of the formula (1) in which D is a substituted or unsubstituted benzothiazolyl, pyridyl or phenyl radical, $V^1$ and $V^2$ independently of one another are in each case hydrogen, methyl, ethyl, methoxy or ethoxy, X is hydrogen, methyl, ethyl, methoxy or ethoxy, Z is —CO—CH$_3$, $R^1$ is methyl or hydroxyethyl, $R^2$ and $R^3$ independently of one another are in each case $C_1$-$C_3$alkyl, A is ethylene, propylene or butylene, n is 1 or 2 and An$^\ominus$ is an anion.

Amongst these the disazo dyes of the formula (2)

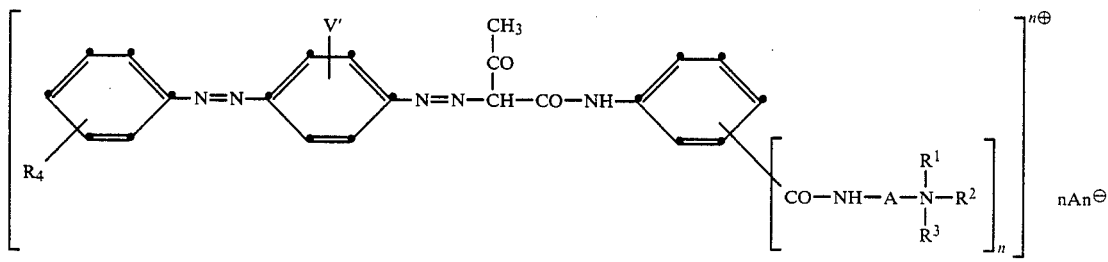

in which $R^1$, $R^2$ and $R^3$ have the meanings listed earlier in the text and An$^\ominus$ is an anion. The following are examples of suitable substituents for the phenyl group Q: $C_1$-$C_4$alkyl, $C_1$-$C_4$alkoxy, halogen or nitro. X is preferably hydrogen, methyl, ethyl, methoxy, ethoxy, acetylamino, propionylamino, methoxycarbonylamino, ethoxycarbonylamino or a group of the formula —NH—CHO, —NH—CO—NH$_2$,

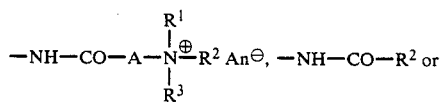

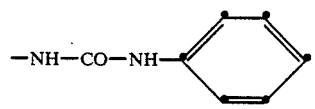

in which A is ethylene, propylene or butylene, $R^1$ is methyl or hydroxyethyl and $R^2$ and $R^3$ independently of one another are in each case $C_1$-$C_3$alkyl. X is particularly preferably hydrogen, methyl or methoxy.

in which $R^4$ is hydrogen, chlorine, $C_1$-$C_4$alkyl, $C_1$-$C_4$alkoxy or a group of the formula

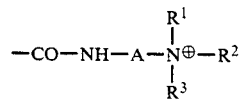

$R^1$ is methyl or hydroxyethyl, $R^2$ and $R^3$ independently of one another are in each case $C_1$-$C_3$alkyl, A is ethylene or propylene, V' is hydrogen, methyl or methoxy, n is 1 or 2 and An$^\ominus$ is an anion, are particularly preferred.

The preparation of the disazo dyes of the formula (1) is effected in a manner known per se, for example by diazotizing an amine of the formula

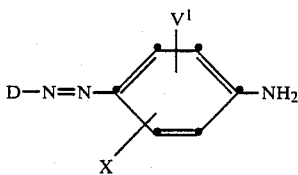

(3)

and coupling the product with a compound of the formula

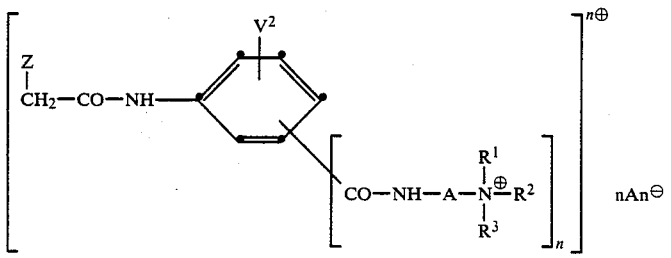

the meanings and preferences previously indicated applying to D, X, $V^1$, Z, $V^2$, A, $R^1$, $R^2$, $R^3$, n and An.

The invention also relates to the compounds of the formula (4), to their preparation and to their use as coupling components for the preparation of azo dyes. They are prepared in a manner known per se by reacting the amines of the formula

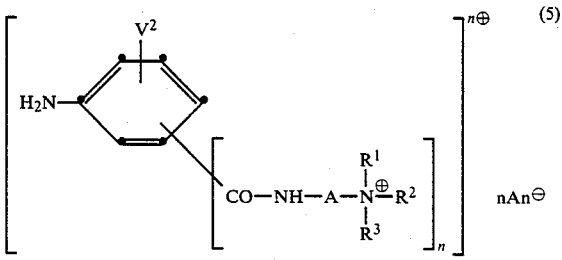

in a manner known per se with an acylating agent which introduces the radical Z—CH$_2$—CO—. The following are examples of suitable acylating agents: Diketene, methyl acetoacetate, ethyl acetoacetate, ethyl cyanoacetate, methyl cyanoacetate, dimethyl malonate, diethyl malonate, malonic acid monomethyl esteramide, malonic acid monomethyl ester imino-ester and methyl benzoylacetate. The reaction is carried out, for example, in an aqueous solution at a temperature between 0° and 80° C., preferably between 10° and 50° C., and in the presence of a base, for example sodium carbonate or bicarbonate or potassium carbonate or bicarbonate.

The compounds of the formula (5) are known, for example from DE-A 2,915,323.

The amines of the formula (3) are known or can be obtained in a known manner.

The diazotization of the amines of the formula (3) is carried out in a manner known per se, for example by means of sodium nitrite in an acid, aqueous medium, for example in hydrochloric acid or sulfuric acid. The diazotization can, however, also be carried out by means of other diazotizing agents, for example by means of nitrosylsulfuric acid. An additional acid can be present in the reaction medium, for example phosphoric acid, sulfuric acid, acetic acid, hydrochloric acid or mixtures of these acids, for example mixtures of phosphoric acid and acetic acid. The diazotization is advantageously carried out at temperatures from −10° to 30° C., for example from −10° C. to room temperature.

The coupling of the diazotized compound of the formula (3) with coupling component of the formula (4) is also carried out in a known manner, for example in an acid, aqueous or aqueous-organic medium, advantageously at temperatures from −10° to 30° C., in particular temperatures below 10° C. Examples of acids used are hydrochloric acid, acetic acid, sulfuric acid or phosphoric acid. The diazotization and coupling can, for example, be carried out in a one-pot process, i.e. in the same reaction medium.

The azo compounds of the formula (1) are employed both as powder or granule preparations and in the form of concentrated solutions. Powder preparations are formulated in a customary manner with standardizing agents, such as sodium sulfate, phosphate, chloride or acetate, in the presence of anti-dust agents, or the azo compounds are put on the market without further treatment in the form of spray-dried preparations. Concentrated dye solutions can be of an aqueous or aqueous-organic nature, preference being given to customary additives which are as readily degradable as possible, such as organic acids, preferably acetic acid, formic acid, lactic acid or citric acid, amides, such as formamide, dimethylformamide or urea, and alcohols, such as glycol, diglycol or diglycol ethers, preferably the methyl or ethyl ether.

The azo compounds of formula (1) are used, in particular, as dyes for dyeing and printing textile materials, paper or leather and for the preparation of inks. Suitable textile materials are natural and synthetic materials which can be dyed cationically. The novel azo compounds are preferably employed for dyeing and printing paper, thin board and cardboard in bulk and on the surface, and also textile materials which, for example, advantageously consist of homopolymers or copolymers of acrylonitrile or of synthetic polyamides or polyesters which have been modified by acid groups. These textile materials are preferably dyed in an aqueous, neutral or acid medium by the exhaustion process, if appropriate under pressure or by the continuous process. In this regard the textile material can be in a very wide variety of forms, for example as fibres, filaments, woven fabrics, knitted fabrics, piece goods and finished goods, such as shirts or pullovers.

The dyes according to the invention make it possible to produce level dyeings or prints which are distinguished by very good overall fastness properties, in particular a very high degree of exhaustion and good fastness properties to water.

In addition the novel azo compounds of the formula (1) can also be used for dyeing and printing natural and regenerated cellulose materials, in particular cotton and viscose, in which regard deeply coloured dyeings are also obtained.

The novel azo compounds of the formula (1) have a good affinity and a good degree of exhaustion on these textile materials, and the resulting dyeings exhibit very good fastness properties, above all fastness properties to wet processing.

A preferred use of the novel azo compounds of the formula (1) consists in their application for dyeing paper of all types, above all, bleached, unsized and sized, lignin-free paper, it being possible to use bleached or unbleached pulp as the starting material and to use hardwood pulp or softwood pulp, such as birch and/or pine sulfite pulp and/or sulfate pulp. These compounds are very particularly suitable for dyeing unsized paper, (for example napkins, table cloths or hygienic paper) as a consequence of their very high affinity for this substrate.

The novel azo compounds of the formula (1) are absorbed very readily by these substrates, and the effluents remain virtually colorless.

Dyeings in yellow shades are obtained.

The resulting dyeings are distinguished by good overall fastness properties, such as good fastness to light, while at the same time having high clarity and depth of colour and fastness to wet processing, i.e. they show no tendency to bleed when dyed paper is brought into contact in the wet state with moist white paper. In addition, they exhibit good fastness to alum, acids and alkalis. Their fastness to wet processing relates not only to water, but also to milk, fruit juices and sweetened mineral water; owing to their good fastness to alcohol, they are also resistant to alcoholic beverages. This property is, for example, particularly desirable for napkins and table cloths in the case of which it is to be expected that the dyed paper will come into contact in the wet state (for example soaked in water, alcohol, surfactant solution etc.) with other surfaces, such as textiles, paper and the like, which must be protected from soiling.

The high affinity for paper and the high rate of exhaustion of the novel dyes is a great advantage for the continuous dyeing of paper.

The following Examples illustrate the invention without limiting it thereto. Parts are by weight and the temperatures are quoted in degrees Centigrade unless stated otherwise.

The abbreviation RKN is a quality designation and indicates the degree of purity of the cellulose; the abbreviation SR (Schopper-Riegler) indicates the freeness.

EXAMPLE 1

87 parts of 4-amino-3'-(N,N,N-trimethylaminopropyl)-benzamide methosulfate are dissolved in 250 parts of water, and the pH of the solution is adjusted to 3 with 2N sulfuric acid. 23 parts of diketene are then added dropwise in the course of 30 minutes, the pH being kept meanwhile at a value of 3 by adding 10 parts of 10% sodium carbonate solution. 102 parts of the compound of the following structure are obtained:

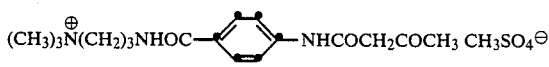

The solution can be employed without further treatment for the preparation of azo dyes. The compound of the above structure can be precipitated virtually completely by evaporating the solution to about half its volume and adding absolute ethanol.

EXAMPLES 2–14

The coupling components listed in the following table can be prepared from the corresponding 4-aminobenzamides by the procedure described in Example 1.

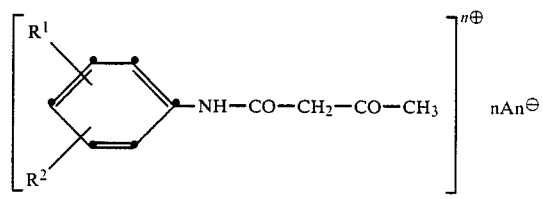

| Exp. | R$^1$ | R$^2$ | n |
|---|---|---|---|
| 2 | 4-(CH$_3$)$_3$N$^⊕$(CH$_2$)$_3$NHCO— | H | 1 |
| 3 | 3-(CH$_3$)$_3$N$^⊕$(CH$_2$)$_3$NHCO— | H | 1 |
| 4 | 3-(CH$_3$)$_3$N$^⊕$(CH$_2$)$_3$NHCO— | 5-(CH$_3$)$_3$N$^⊕$(CH$_2$)$_3$NHCO— | 2 |
| 5 | 2-(CH$_3$)$_3$N$^⊕$(CH$_2$)$_3$NHCO— | 5-(CH$_3$)$_3$N$^⊕$(CH$_2$)$_3$NHCO— | 2 |
| 6 | 4-(C$_2$H$_5$)$_2$N$^⊕$(CH$_2$)$_3$NHCO—<br>          \|<br>          CH$_3$ | H | 1 |
| 7 | 4-(CH$_3$)$_3$N$^⊕$(CH$_2$)$_2$NHCO— | H | 1 |
| 8 | 3-(CH$_3$)$_3$N$^⊕$(CH$_2$)$_2$NHCO— | H | 1 |
| 9 | 3-(CH$_3$)$_3$N$^⊕$(CH$_2$)$_2$NHCO— | 5-(CH$_3$)$_3$N$^⊕$(CH$_2$)$_2$NHCO— | 2 |
| 10 | 2-(CH$_3$)$_3$N$^⊕$(CH$_2$)$_2$NHCO— | 5-(CH$_3$)$_3$N$^⊕$(CH$_2$)$_2$NHCO— | 2 |
| 11 | 4-(C$_2$H$_5$)$_3$N$^⊕$(CH$_2$)$_2$NHCO— | H | 1 |
| 12 | 3-(C$_2$H$_5$)$_3$N$^⊕$(CH$_2$)$_2$NHCO— | H | 1 |

-continued

| Exp. | R¹ | R² | n |
|------|----|----|---|
| 13 | 3-(C₂H₅)₃N⊕(CH₂)₂NHCO— | 5-(C₂H₅)₃N⊕(CH₂)₂NHCO— | 2 |
| 14 | 2-(C₂H₅)₃N⊕(CH₂)₂NHCO— | 5-(C₂H₅)₃N⊕(CH₂)₂NHCO— | 2 |

EXAMPLE 15

2 Parts of 4-aminoazobenzene are stirred in 50 parts of water and 3 parts by volume of 30% hydrochloric acid, and the mixture is diazotized at 0°–5° with 2.5 parts of 4N sodium nitrite solution. The resulting solution of the diazo component is added directly to 18 parts of the solution obtained in Example 1, containing 4.3 parts of the coupling component, and coupling is carried out at pH 4–5.5 and 0°–5°. The precipitated dye is filtered off with suction. It has the formula

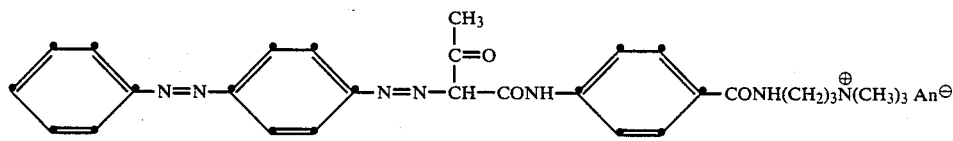

(An⊖: Mixtures of Cl⁻ and CH₃SO₄⁻)

It dyes paper in brilliant yellow shades having good fastness to light.

EXAMPLE 16

4-Amino-2,2'-dimethylazobenzene is employed as the diazo component and the procedure is in other respects as described in Example 15. This gives a solution of the dye, which is precipitated with ZnCl₂ and has the formula

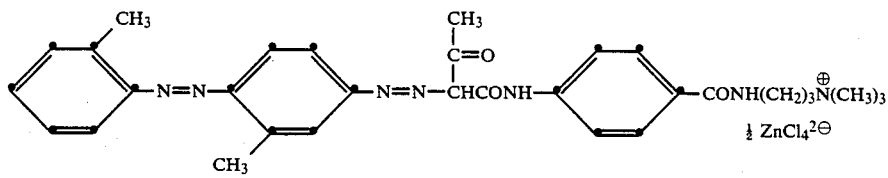

and dyes paper in a yellow shade having good fastness properties.

EXAMPLE 17

4-Aminophenylazo-3'-pyridine is employed as the diazo component and the procedure is in other respects as in Example 16. This gives the dye of the formula

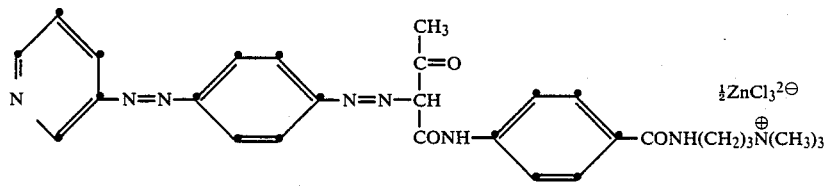

which dyes paper in yellow shades.

EXAMPLE 18

4-Amino-2'-chloroazobenzene is employed as the diazo component and the procedure is in other respects as in Example 16. This gives the dye of the formula

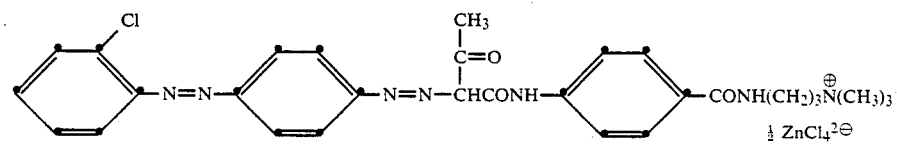

which dyes paper in yellow shades.

EXAMPLE 19

.7 Parts of 4-amino-3'-(N,N,N-trimethylaminopropyl)-benzamide methosulfate are stirred in 50 parts of water and 8 parts by volume of 30% hydrochloric acid, and the mixture is diazotized at 0°–5° with 5 ml of 4N sodium nitrite solution. The resulting solution is added dropwise to 2.4 parts of 2,5-dimethylaniline, and the mixture is stirred for 12 hours at 0°–10°. The temperature of the coupling mixture is then lowered to 0°–5°, 6 parts by volume of 32% hydrochloric acid are added and diazotization is carried out with 5 parts of 4N sodium nitrite solution. The resulting diazo solution is added to 36 parts by volume of the solution obtained in Example 1, containing 8.6 parts of the coupling component, and coupling is carried out at pH 5–7 and at 0°–5°. The dye is then precipitated as the zincate-chloride by means of $ZnCl_2$. The dye dyes paper in yellow shades and has the formula

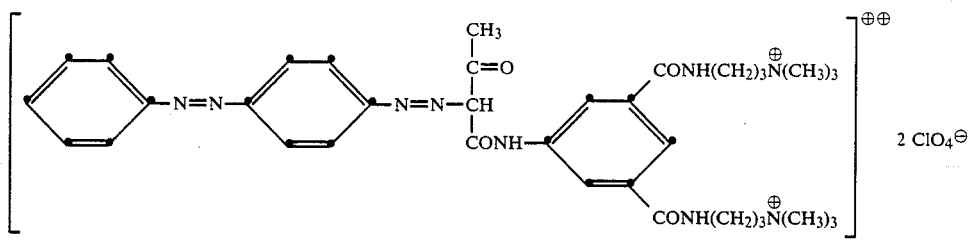

NaClO$_4$, affording, in 90% yield, the dye of the formula which dyes paper in yellow shades having good fastness properties.

EXAMPLES 21–33

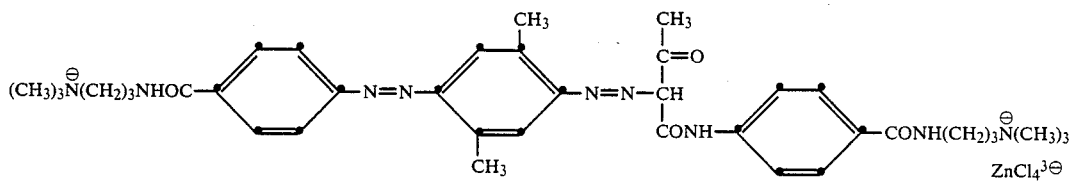

EXAMPLE 20

The procedure is analogous to Example 15, but the coupling component from Example 4 in aqueous solution is employed and the dye is precipitated by adding The procedure is analogous to Example 15, but equivalent amounts of the diazo and coupling components listed in the following Table are employed, affording the dyes of analogous structure, which dye paper in greenish-tinged yellow shades having good fastness properties.

| Exp. | Diazo component | Coupling component |
|---|---|---|
| 21 | | from Example 7 |
| 22 | | from Example 8 |
| 23 | | from Example 9 |
| 24 | | from Example 10 |

| Exp. | Diazo component | Coupling component |
|---|---|---|
| 25 | 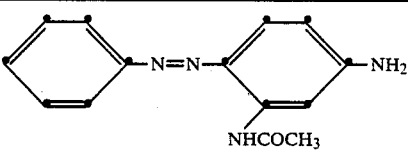 NHCOCH₃ | from Example 11 |
| 26 | 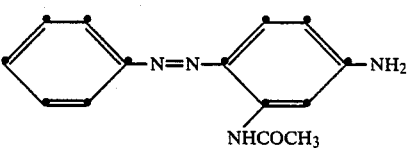 NHCOCH₃ | from Example 12 |
| 27 | 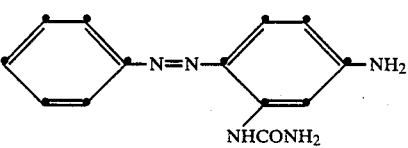 NHCONH₂ | from Example 12 |
| 28 | 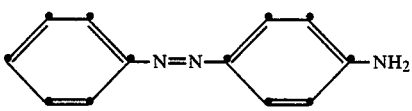 | from Example 3 |
| 29 | 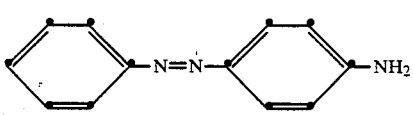 | from Example 5 |
| 30 | 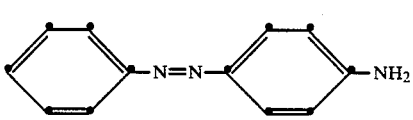 | from Example 6 |
| 31 | 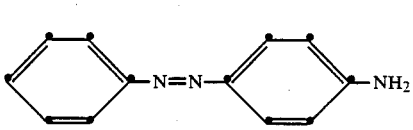 | from Example 13 |
| 32 | 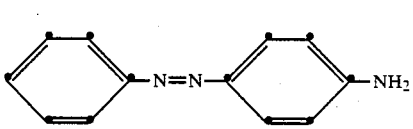 | from Example 14 |
| 33 | 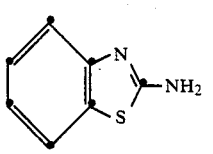 | from Example 1 |

EXAMPLE 34

50 Parts of chemically bleached beech sulfite pulp are mixed with 50 parts of bleached RKN 15 cellulose (freeness 22° SR) and 2 parts of the dye according to Example 1 in water (pH 6, hardness of water 10° of German hardness, temperature 20° and liquor ratio 1:40). After stirring for 15 minutes, paper sheets are produced on a Frank sheet-former.

The paper is dyed an intense shade of yellow. The effluent is virtually completely colourless. The degree of exhaustion is virtually 100%. The fastness properties to light and wet processing are excellent.

EXAMPLE 35

A paper web is produced from bleached beech sulfite pulp (22° SR) on a continuously operating laboratory paper machine. An aqueous solution of the dye according to Example 1 is metered into the low consistency material continuously, ten seconds upstream of the headbox and under conditions of vigorous turbulence (0.5% dyeing, liquor ratio 1:400, hardness of water 10° of German hardness, pH 6 and temperature 20°).

An intense yellow shade of medium intensity is produced on the paper web. The effluent is virtually completely colourless.

EXAMPLE 36

10 Parts of cotton fabric (bleached, mercerized cotton) are dyed in a laboratory beam dyeing machine in 200 parts of a liquor (hardness of water 10° of German hardness, pH 4, dye liquor circulated 3 times per minute) containing 0.05 part of the dye according to Example 1. The temperature is raised from 20° to 100° in the course of 60 minutes and is then kept constant for 15 minutes.

The dye liquor is completely exhausted. An intense yellow coloration which is distinguished by good fastness to light and fastness to wet processing is produced on the cotton fabric.

A textile fabric composed of regenerated cellulose (viscose) is dyed by the same procedure. An intense yellow coloration which has good fastness to light and fastness to wet processing is also obtained on this material by means of the dye of Example 1.

What is claimed is:

1. A disazo dye of the formula

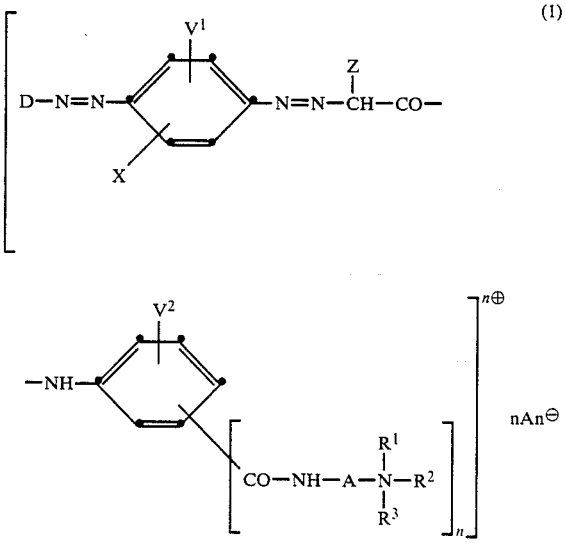

wherein

D is a diazo radical selected from the group consisting of thienyl, thiazolyl, isothiazolyl, 1,2,4-thiadiazolyl, 1,3,4-thiadiazolyl, benzothiazolyl, benzoisothiazolyl, pyrazolyl, imidazolyl, 1,2,3-triazolyl, 1,2,4-triazolyl, pyridyl and phenyl, said radical being unsubstituted or further substituted by $C_1$–$C_4$-alkyl; $C_1$–$C_4$-alkyl substituted by hydroxyl, $C_1$–$C_4$-alkoxy, cyano, phenyl, halogen or —CO—U in which U is $C_1$–$C_6$-alkyl or phenyl; $C_1$–$C_4$-alkoxy, halogen, trifluoromethyl, cyano, nitro, acyl, benzoyl, carboalkoxy, $C_1$–$C_4$alkylsulfonyl, phenylsulfonyl, sulfonamide, arylazo or

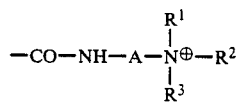

wherein $R_1$, $R_2$ and $R_3$ are independently of one another $C_1$–$C_6$-alkyl or $C_1$–$C_6$-alkyl substituted by hydroxyl, phenyl, alkoxy, cyano, halogen or —CO—U in which U is $C_1$–$C_6$-alkyl or phenyl, or $R_1$, $R_2$ and the nitrogen linking them are a heterocyclic radical selected from the group consisting of pyrrolidine, piperidine, morpholine and piperazine, or $R_1$, $R_2$, $R_3$ and the nitrogen linking them are monoquaternized triethylenediamine or pyridinium, $V^1$ and $V^2$ independently of one another are hydrogen, $C_1$–$C_4$-alkoxy or $C_1$–$C_4$-alkoxy substituted by hydroxyl, halogen, cyano or $C_1$–$C_4$-alkoxy, halogen, cyano, $C_1$–$C_4$-alkyl or $C_1$–$C_4$-alkyl substituted by hydroxyl, cyano, $C_1$–$C_4$-alkoxy or halogen, X is hydrogen, $C_1$–$C_4$-alkyl, $C_1$–$C_4$-alkoxy, halogen, cyano or a group of the formula —NH—CHO, —NH—CO—NH$_2$, —NH—CO—NH—Q or —NH—CO—(O)$_m$—Q in which m is zero or 1 and Q is $C_1$–$C_4$alkyl or $C_1$–$C_4$-alkyl substituted by halogen,

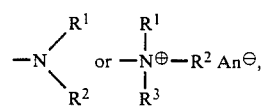

or phenyl or phenyl substituted by $C_1$–$C_4$-alkyl, $C_1$–$C_4$-alkoxy, halogen or nitro, Z is $C_1$–$C_4$alkyl—CO—, —CN, —COO—$C_1$–$C_4$alkyl, —CONH$_2$ or —CO—$C_6H_5$, A is alkylene of 2 to 6 carbon atoms, n is 1 or 2 and An$^\ominus$ is an anion.

2. A disazo dye according to claim 1, in which D is phenyl which is unsubstiuted or substituted by $C_1$–$C_4$alkyl or $C_1$–$C_4$alkoxy, chlorine or a group of the formula

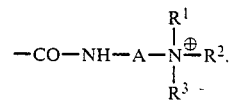

3. A disazo dye according to claim 1, in which $R^1$, $R^2$ and $R^3$ independently of one another are methyl, ethyl, n-propyl, isopropyl, n-, sec- or tert-butyl, linear or branched pentyl or hexyl, cyclopentyl or cyclohexyl radicals, said radicals being unsubstituted or substituted by hydroxyl, phenyl or alkoxy, or in which $R^1$, $R^2$ and the nitrogen atom linking them are a pyrrolidine, piperidine, morpholine or piperazine radical, or in which $R^1$, $R^2$, $R^3$ and the nitrogen atom linking them are a pyridinium or monoquaternized triethylenediamine radical.

4. A disazo dye according to claim 3, in which $R_1$ is methyl or hydroxyethyl and $R^2$ and $R^3$ independently of one another are $C_1$–$C_3$alkyl.

5. A disazo dye of claim 4 wherein $R^2$ and $R^3$ are methyl.

6. A disazo dye according to claim 1, in which $V^1$ and $V^2$ independently of one another are hydrogen, methyl or methoxy.

7. A disazo dye according to claim 1, in which X is hydrogen, methyl, ethyl, methoxy, ethoxy, acetylamino, propionylamino, methoxycarbonylamino, ethoxycarbonylamino or a group of the formula —NH—CHO, —NH—CO—NH$_2$,

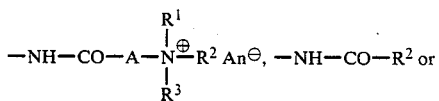

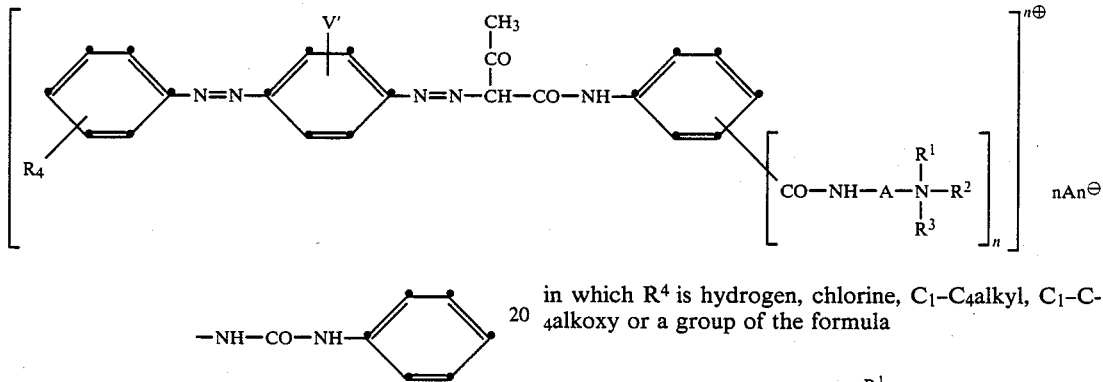

in which A is ethylene, propylene or butylene, $R^1$ is methyl or hydroxyethyl and $R^2$ and $R^3$ independently of one another are $C_1$-$C_3$alkyl.

8. A disazo dye according to claim 7, in which X is hydrogen, methyl or methoxy.

9. A disazo dye according to claim 1, in which Z is —CN, —COO—$C_1$-$C_2$alkyl, —CO—$NH_2$ or —CO—$C_6H_5$, —CO—$CH_3$.

10. A disazo dye of claim 9 wherein Z is —CO—$CH_3$.

11. A disazo dye according to claim 1, in which D is a substituted or unsubstituted benzothiazolyl, pyridyl or phenyl radical, $V^1$ and $V^2$ independently of one another are in each case hydrogen, methyl, ethyl, methoxy or ethoxy, X is hydrogen, methyl, ethyl, methoxy or ethoxy, Z is —CO—$CH_3$, $R^1$ is methyl or hydroxyethyl, $R^2$ and $R^3$ are $C_1$-$C_3$alkyl, A is ethylene, propylene or butylene, n is 1 or 2 and $An^{\ominus}$ is an anion.

12. A disazo dye of the formula

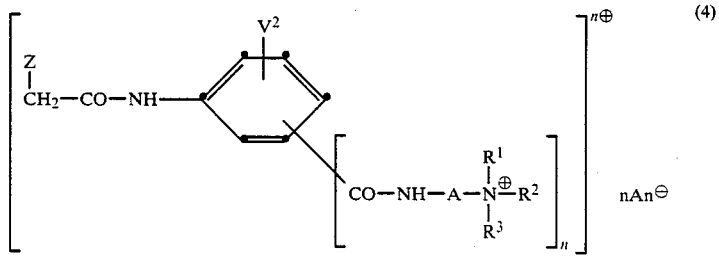

in which $R^4$ is hydrogen, chlorine, $C_1$-$C_4$alkyl, $C_1$-$C_4$alkoxy or a group of the formula $$-CO-NH-A-\overset{R^1}{\underset{R^3}{N^{\oplus}}}-R^2$$

$R^1$ is methyl or hydroxyethyl, $R^2$ and $R^3$ independently of one another are in each case $C_1$-$C_3$alkyl, A is ethylene or propylene, V' is hydrogen, methyl or methoxy, n is 1 or 2 and $An^{\ominus}$ is an anion.

13. A compound of the formula $$\left[ \underset{CH_2-CO-NH}{\overset{Z}{|}} \underset{}{\bigodot}^{V^2} \left[ CO-NH-A-\underset{R^3}{\overset{R^1}{\underset{|}{N^{\oplus}}}}-R^2 \right]_n \right]^{n\oplus} nAn^{\ominus} \quad (4)$$

in which Z, $V^2$, A, $R^1$, $R^2$, $R^3$, n and $An^{\ominus}$ have the meanings indicated in claim 1.

* * * * *